US008290213B2

US 8,290,213 B2

(12) United States Patent
Chen et al.

(10) Patent No.: US 8,290,213 B2
(45) Date of Patent: Oct. 16, 2012

(54) METHOD OF LOCATING LICENSE PLATE OF MOVING VEHICLE

(75) Inventors: Chao-Ho Chen, Tai-Nan (TW); Chi-Ming Huang, Taipei County (TW); Hui-Pin Huang, Tainan (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 364 days.

(21) Appl. No.: 12/793,699

(22) Filed: Jun. 4, 2010

(65) Prior Publication Data
US 2011/0135156 A1 Jun. 9, 2011

(30) Foreign Application Priority Data
Dec. 4, 2009 (TW) .............................. 98141502 A

(51) Int. Cl.
*G06K 9/00* (2006.01)

(52) U.S. Cl. ...................................................... 382/105
(58) Field of Classification Search .................. 382/103, 382/104, 105, 162, 165, 169, 170, 172, 260–273
See application file for complete search history.

(56) References Cited

U.S. PATENT DOCUMENTS

| 7,663,502 B2 * | 2/2010 | Breed ........................ 340/12.25 |
| 2006/0208169 A1 * | 9/2006 | Breed et al. .................... 250/221 |
| 2006/0274973 A1 * | 12/2006 | Mohamed et al. ............ 382/281 |

OTHER PUBLICATIONS

Bai, "A fast license plate extraction method on complex background", Proc. IEEE Intelligent Transportation Systems, vol. 2, pp. 985-987, Oct. 2003.
Kim, "A robust license-plate extraction method under complex image conditions",IEEE International Conference on Pattern Recognition, vol. 3, pp. 216-219, 2002.
Yu, On the study of automatic traffic surveillance system, Jun. 2002.
Zhu, "A study of locating vehicle license plate based on color feature and mathematical morphology",Proc. IEEE International Conference on Signal Processing, vol. 1, pp. 748-751, 2002.
Yoshimori, "License Plate Detection System in Rainy Days",IEEE International Symposium on Computational Intelligence in Robotics and Automatic, vol. 2, pp. 972-976, Jul. 2003.
Cao, "An adaptive approach to vehicle license plate localization",IEEE Conference of Industrial Electronics Society, vol. 2, pp. 1786-1791, 2003.
Otsu, "A Threshold Selection Method from Gray-Level Histograms",IEEE Trans. On System, Man and Cybernetics, vol. 9, pp. 62-66, 1979.

* cited by examiner

*Primary Examiner* — Brian Le
(74) *Attorney, Agent, or Firm* — Winston Hsu; Scott Margo

(57) ABSTRACT

While locating a license plate of a moving vehicle on consecutive images, motion detection is first performed on the consecutive images to detect a moving vehicle image, which is segmented using edge detection, and the segmented moving vehicle image is analyzed to retrieve characteristics for locating a license plate image and determining characters on the located license plate image. As a result, a precise location of the license plate is thus precisely located for further recognition no matter what weathers in which the consecutive images are recorded. The above-mentioned technique requires merely few calculations, is easily implemented, and may be applied on an intelligent digital video recording (DVR) system including many computer-vision functions.

15 Claims, 4 Drawing Sheets

210

| -1 | -2 | -1 |
|---|---|---|
| 0 | 0 | 0 |
| 1 | 2 | 1 |

220

| -1 | 0 | 1 |
|---|---|---|
| -2 | 0 | 2 |
| -1 | 0 | 1 |

FIG. 2

METHOD OF LOCATING LICENSE PLATE OF MOVING VEHICLE

BACKGROUND OF THE INVENTION

1. Field of the Invention

The present invention discloses a method of locating a license plate of a moving vehicle, and more particularly, to a method of locating license plate of a moving vehicle by edge detection, binarization, morphological operations, and calculating edge densities.

2. Description of the Prior Art

In recent years, with the aid of improved technologies and popularities of computers, a monitoring system for monitoring roads is not merely required to acquire conventional recording functions, but more various applications related to computer networks and image processing, and as a result, information embedded in recorded monitoring images can be retrieved for references in a convenient, simple, popular manner. Besides, with the increased amount of vehicles, various problems about traffic security and related law enforcements also arise, such as parking area management, escapees of freeway charges, tracking of vehicles breaking traffic security codes, searching of stolen vehicles, monitoring of moving vehicles at roads. Thereby, researches on intelligent transportation systems (ITS) are prompted.

Recognition of a license plate of a moving vehicle is a primary application for the ITS. However, before performing the recognition, locating the license plate becomes a critical issue, i.e., if an outcome of locating the license plate is unclear, recognition of the license plate may fail under a great chance. In the recognition of the license plate, a license plate template is first retrieved by segmenting visual objects, and the image recognition technologies are used for recognizing the numbers on the license plate. However, there are large amounts of researches on recognizing the numbers on the license plate, whereas there are few researches on segmenting (or locating) the license plate template of a moving vehicle. Therefore, moving/visual object segmentation becomes a required prior core technology in developing ITS, on computer visual applications including detection, recognition, counting, and tracking of a moving vehicle.

For license plate locating, characteristics of the license plate, such as edge, contrast, and colors, are directly used for searching and locating the license plate on an image in certain methods. With respect to the edge, the location of the license plate on the image is assumed to acquire most-significant variation, therefore, edge algorithms may be used for locating edges of the license plate, for example, locating the location of the license plate by using a mask or morphological operations. In "A fast license plate extraction method on complex background", which is edited by H. L. Bai, J. M. Zhu and C. P. Liu, and is published in Proc. IEEE Intelligent Transportation Systems, vol. 2, pp. 985-987, on October 2003, a freeway charging system is proposed. Since the proposed freeway charging system is required to rapidly and correctly recognizing a license plate, the license plate is located by using vertical edge detection, an edge density map, binarization, and dilation. In "A robust license-plate extraction method under complex image conditions", which is edited by Sunghoon Kim, Daechul Kim, Younbok Ryu, Gyeonghwan Kim, and is published in IEEE International Conference on Pattern Recognition, vol. 3, pp. 216-219, on 2002, a robust license plate locating method is proposed. The proposed method includes two primary steps. In the first step, the location of the license plate is searched according to gradients on an image and by using Sobel's Algorithm. In the second step, characteristics of the license plate are used for directly defining a region of the license plate on the image, and boundaries of the license plate are further found out. By using both the steps, the license plate may be located under various environments. In the thesis "On the study of automatic traffic surveillance system", which is edited by Yu, at the Graduate School of Electrical Engineering from Yuan Ze University, it is indicated that a luminance contrast between characters on the license plate and background on the image. Morphological operations are used for finding regions fitting contrast characteristics of the license plate, and erroneous blocks are filtered off according to geometric properties of the license plate. Images under various environments are also used for robustness of the proposed monitor system.

Some technologies perform the license plate locating according to color characteristics. For example, according to "A study of locating vehicle license plate based on color feature and mathematical morphology", which is edited by W. G. Zhu, G. J. Hou and X. Jia, and published in Proc. IEEE International Conference on Signal Processing, vol. 1, pp. 748-751, on 2002, the location of the license plate image is determined according to specific colors on the license plate with the aid of morphological operations. The proposed method is appropriate for primary colors indicated by red, green, and blue. In the proposed method, images of a moving vehicle are dynamically fetched, and a vehicle image on the fetched images is found according to differences between the fetched images, so as to reduce calculations and to achieve real-time calculations. In "License Plate Detection System in Rainy Days", which is edited by Yoshimori S., Mitsukura Y., Fukumi M., Akamatsu N., Khosal R., and is published in IEEE International Symposium on Computational Intelligence in Robotics and Automatic, vol 2, pp. 972-976, on July 2003, a license plate automatic recognition system used under complicated environments is proposed, and the license plate image is located with the aid of Fuzzy Theory, color transformation, and color edge detection, in considerations of characteristics including edges and colors of the license plate. About the color transformation, HSI color transformation is used, where H indicates hue, S indicates saturation, and I indicates intensity of luminance. Since hues of a same color on a same image cannot be affected by luminance, and can be immune from shadows, so that HSI color transformation is appropriate for outdoor environments, and for license plate image recognition as well. In "An adaptive approach to vehicle license plate localization", which is edited by Guanozhi Cao, Jiaqian Chen, and Jingping Jiang, and is published in IEEE Conference of Industrial Electronics Society, vol. 2, pp. 1786-1791, on 2003, a critical value acquiring robustness is determined from various environments with the aid of the real coded genetic algorithm (RGA), and the critical value is used for searching regions acquiring colors similar with the license plate. In "A Threshold Selection Method from Gray-Level Histogram", which is edited by N. Otsu, and is published in IEEE Trans. On System, Man and Cybernetics, vol. 9, pp. 62-66, on 1979, an adjustable critical value is also determined by using an algorithm similar with RGA, and is used for defining the location of the license plate.

SUMMARY OF THE INVENTION

The claimed invention discloses a method for locating license plate of a moving vehicle. The method comprises transforming a color image, which films a moving vehicle, into a first gray level image; performing edge detection on the first gray level image by using a Sobel operator, so as to generate a second gray level image, where the second gray level image comprises a plurality of gradients of the first gray level image; determining a first intermediate gradient, which is from the plurality of gradients of the first gray level image, to be a threshold value, and processing the second gray level image according to the threshold value so as to generate a third gray level image, when a first pixel amount, which is corresponding to the first intermediate gradient and is of the second gray level image, is larger than a second pixel amount, which is corresponding to a second intermediate gradient and is of the second gray level image, by a multiple, where the second intermediate gradient is from the plurality of gradients of the first gray level image, and where the first intermediate gradient is higher than the second intermediate gradient; performing a morphological operation on the third gray level image, so as to generate a fourth gray level image; scanning the fourth gray level image by using a rectangular mask, so as to determine an edge density of the fourth gray level image; comparing the edge density with a critical edge density, so as to confirm whether there is a license plate image on the fourth gray level image or not; and locating the fourth gray level image so as to locate the license plate image and to display the located license plate image on a screen, when the license plate image is determined to be on the fourth gray level image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Figure 2:
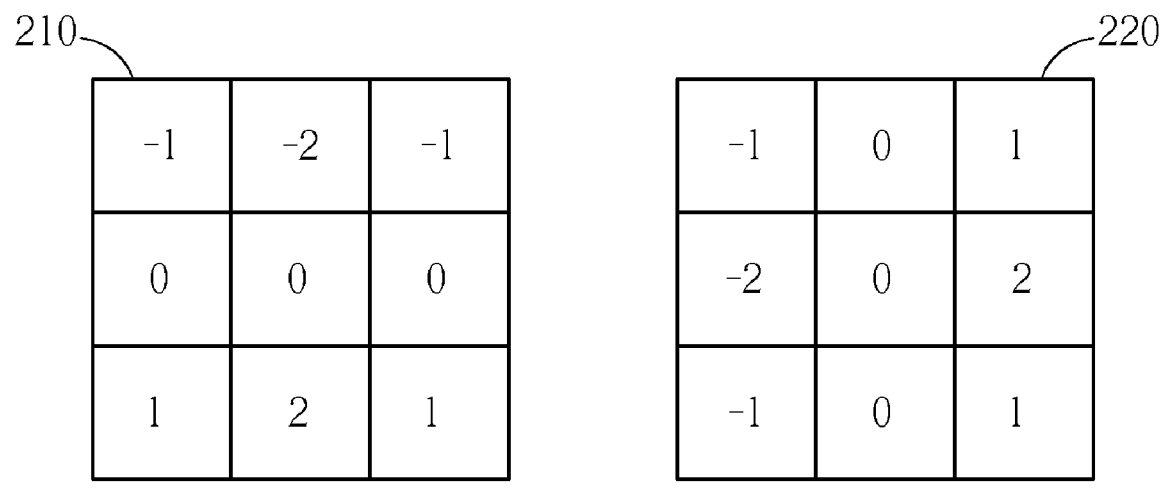

FIG. 2 illustrates a horizontal Sobel operator and a vertical Sobel operator used for performing required edge detection.

DETAILED DESCRIPTION

The present invention discloses a method of locating a license plate. In the disclosed method, a fixed-disposed camera is used for filming moving vehicle and performing detection. The camera may be disposed at entrances and exits of a tunnel to capture an image of a moving vehicle, and an image of a license plate of a moving vehicle is fetched by processing the image of the moving vehicle by using image preprocessing, edge detection, binarization, morphological operations, and a license plate locating algorithm. With the aid of the disclosed method, the location of the license plate of a moving vehicle can also be retrieved under a normal or a rainy weather when the image of the moving vehicle is filmed. The disclosed license plate locating method requires fewer calculations than conventional license plate locating methods, is easy to be implemented, and acquires high precision in locating the license plate. The disclosed license plate locating method of the present invention may be applied on pre-locating of license plates for digital video recorder (DVR) of security monitoring industries, so as to enhance post-recognition of license plates. Moreover, the above-mentioned traffic-related problems may also be neutralized as a result.

Figure 1:
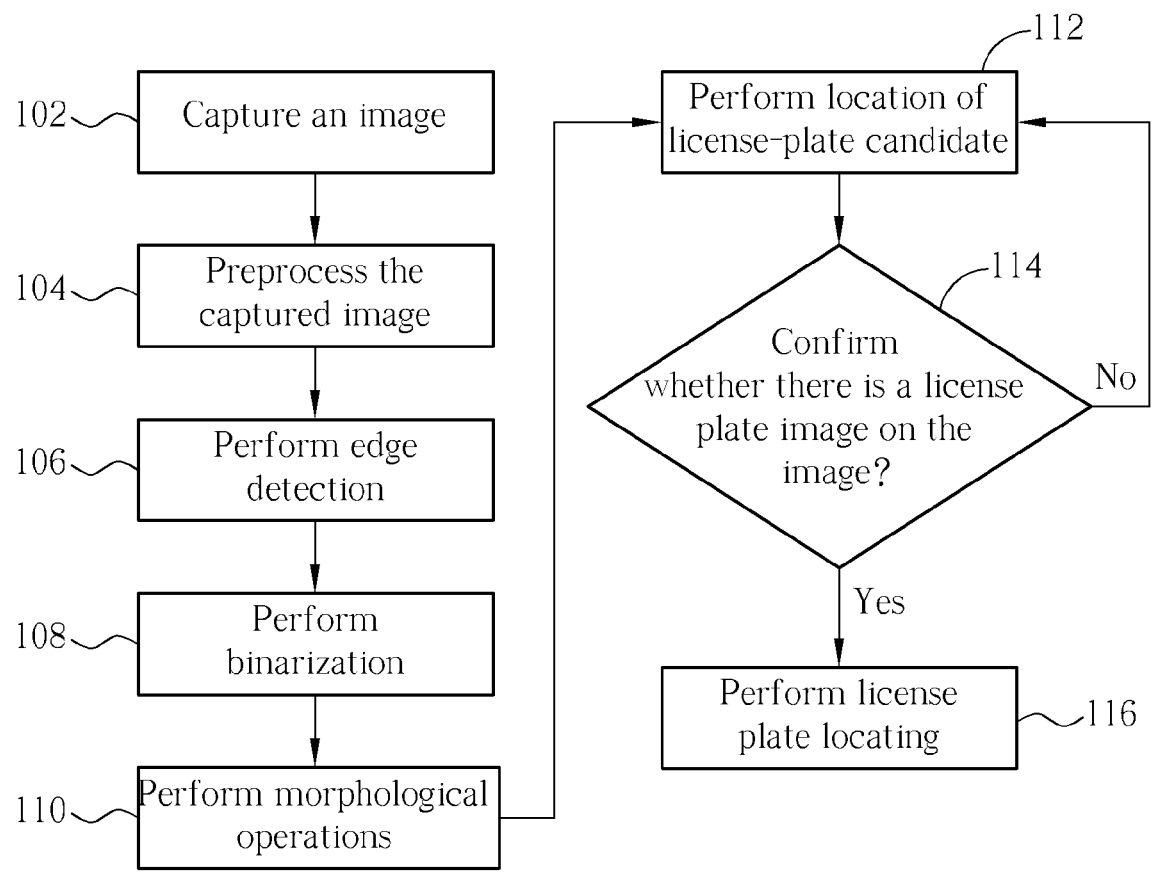
FIG. 1 is a flowchart of the license plate locating method disclosed in the present invention.

Please refer to FIG. 1, which is a flowchart of the license plate locating method disclosed in the present invention, where the disclosed method may be installed on a system for implementation. As shown in FIG. 1, the disclosed method includes steps as follows:

Step 102: Capture an image;
Step 104: Preprocess the captured image;
Step 106: Perform edge detection on the processed image of Step 104;
Step 108: Perform binarization on the processed image of Step 106;
Step 110: Perform morphological operations on the processed image of Step 108;
Step 112: Perform location of license-plate candidate on the image;
Step 114: Confirm whether there is a license plate image on the image. When there is a license plate image on the image, go to Step 116, else, go to Step 112; and
Step 116: Perform license plate locating.

While a system installing the disclosed license plate locating method of the present invention, an image is first fetched in Step 102. In Step 104, the fetched image is preprocessed. In Step 106 and 108, the fetched image is performed with the edge detection and binarization so as to determine at least one candidate license plate image. In Steps 110-116, the license plate locating algorithm is applied for confirming whether a license plate is physically indicated by the at least one candidate license plate image or not, so as to determine a precise location of the license plate.

[1] Preprocessing (Step 104):

Since a conventional license plate primarily shows in white and black, and since significant and concentrated edge variation is aimed to be searched while locating the license plate, colors except for black and white may be ignored during the license plate locating. Therefore, in the preprocessing, the fetched image is first transformed into a gray level image so as to reduce calculations of succeeding processes. The transformation is indicated as follows:

$$\text{Gray}_{i,j} = 0.299 R_{i,j} + 0.587 G_{i,j} + 0.114 B_{i,j} \quad (1);$$

$R_{i,j}$, $G_{i,j}$, and $B_{i,j}$ respectively indicate a red pixel value, a green pixel value, and a blue pixel value at a coordinate (i,j) on the fetched image, and $\text{Gray}_{i,j}$ indicates a gray level at the coordinate (i,j) on the fetched image.

[2] Edge Detection (Step 106):

Since there are significant and concentrated variations in edge on illustrated characters of the license plate, edge detection is used on the fetched image so as to search for at least one region having such significant and concentrated edge variations on said fetched image, and then the found regions are examined so as to confirm whether there are license plate images on said found regions or not. In the disclosed method of the present invention, Sobel operators are used for performing the required edge detection, where Sobel operators include at least a horizontal mask and a vertical mask, such as the masks 210 and 210 shown in FIG. 2. Operations and applications of Sobel operators are known for those who skilled in related art of the present invention, so that details about the Sobel operators are not further described.

Since there are a large amount horizontal edge variations, after processing the fetched image with the aid of the vertical and horizontal Sobel operators, edge-related information of regions having no license plate image is also retrieved. Therefore, in a preferred embodiment of the present invention, merely the vertical Sobel operator is used for performing the edge detection, so that boundaries of the license plate may still be determined and detected without involving the regions having no license plate information.

[3] Binarization (Step 108):

The present invention also discloses a binary threshold retrieving method, which may also be denoted as a gradient binarization method. The gradient binarization method is used for performing binarization of edge detection on the fetched image, where the method may also be applied for images fetched under a normal or a rainy weather.

With the aid of the masks from the Sobel operators, gradients on the fetched image may be calculated according to pixels on said fetched image, where a higher gradient indicates a significant/concentrated edge variation of a corresponding pixel, and a lower gradient indicates a slight edge variation of a corresponding pixel. In a preferred embodiment of the present invention, a value of a gradient may range from 0 to 255. Since gradients retrieved by using Sobel operators may have a value higher than 255, the retrieved gradients have to be binarized according to a following equation (2), so that 255 is regarded as an upper bound of the gradient. The equation (2) is indicated as follows:

$$S(x, y) = \begin{cases} 255, & \text{if } S'(x, y) > 255 \\ S'(x, y), & \text{Otherwise;} \end{cases} \quad (2)$$

S'(x,y) indicates an original gradient, S(x,y) and indicates an adjusted value of S'(x,y).

A pixel amount corresponding to each value of the gradient is then calculated, and may be illustrated as a histogram with respect to each the value of the gradient. According to the histogram, while there is no vehicle existed in the fetched image, most pixels in the fetched image correspond to small gradients, i.e., the pixels indicate small edge variations; besides, pixels having gradients of value 255 on the histogram indicate reticles on the ground so that such pixels are few on the histogram. In comparison of a first image, which does not fetch an image of a moving vehicle, and a second image, which fetches an image of a moving vehicle, with the aid of the histogram, it would be found that there are significantly more pixels having gradients of value 255 in the second image than in the first image, whereas pixels of gradients having values other than 255 vary slightly in both the first and second images. The difference between the first and second images is caused by strong and concentrated edge variations on the license plate of moving vehicle. No matter it is normal or rainy weather, while there is a moving vehicle filmed by the camera, pixels having gradients of value 255 are increased significantly; therefore, a number of pixels having higher gradients are served as a reference in confirming whether there is a moving vehicle filmed by the camera or not.

The binarization in the license locating method of the present invention is implemented as follows:

(a) Calculate an amount of pixels for each value of gradients on an image which has been processed by Sobel operators.

(b) Confirm whether a pixel amount corresponding to a high gradient is significantly increased or not. If it is confirmed that the pixel amount corresponding to the high gradient is significantly increased, go to Step (c).

(c) Denote that $N_i$ indicates a pixel amount of pixels having a gradient value i on the fetched image, where i has an initial value of 255. Note that the gradient value i is regarded as an intermediate gradient before determining a threshold T.

Then a pixel amount corresponding to the gradient value i is confirmed to be significantly larger than a pixel amount corresponding to a gradient value (i−1) or not. If the pixel amount corresponding to the gradient value i is confirmed to be significantly larger than the pixel amount corresponding to a gradient value (i−1), the intermediate gradient value i is assigned to be the threshold T; else, the intermediate gradient value i is confirmed to be larger than a lower bound gradient, which is set to be 100 in a preferred embodiment of the present invention, or not.

If the intermediate gradient value i is confirmed to be larger than the lower bound gradient, the intermediate gradient value i is decremented by 1, and then the decremented intermediate gradient value is thereby examined again in an iterative manner. The examination is indicated by an equation as follows:

$$\begin{cases} T = i, & \text{if } N_i > N_{i-1} * X \\ i = i - 1, & \text{Otherwise,} \end{cases} \quad (3)$$

$$0 < i \leq 255,$$

where X indicates a multiple. In a preferred embodiment of the present invention, a value of the multiple X may be set to 300. In other words, while the pixel amount $N_i$ corresponding to the gradient value i is larger than the pixel amount $N_{i-1}$ corresponding to the gradient value (i−1) by 300 times, the pixel amount $N_i$ is confirmed to be significantly larger than the pixel amount $N_{i-1}$, and at this time, the gradient value i is assigned to the threshold value T.

Figure 3:
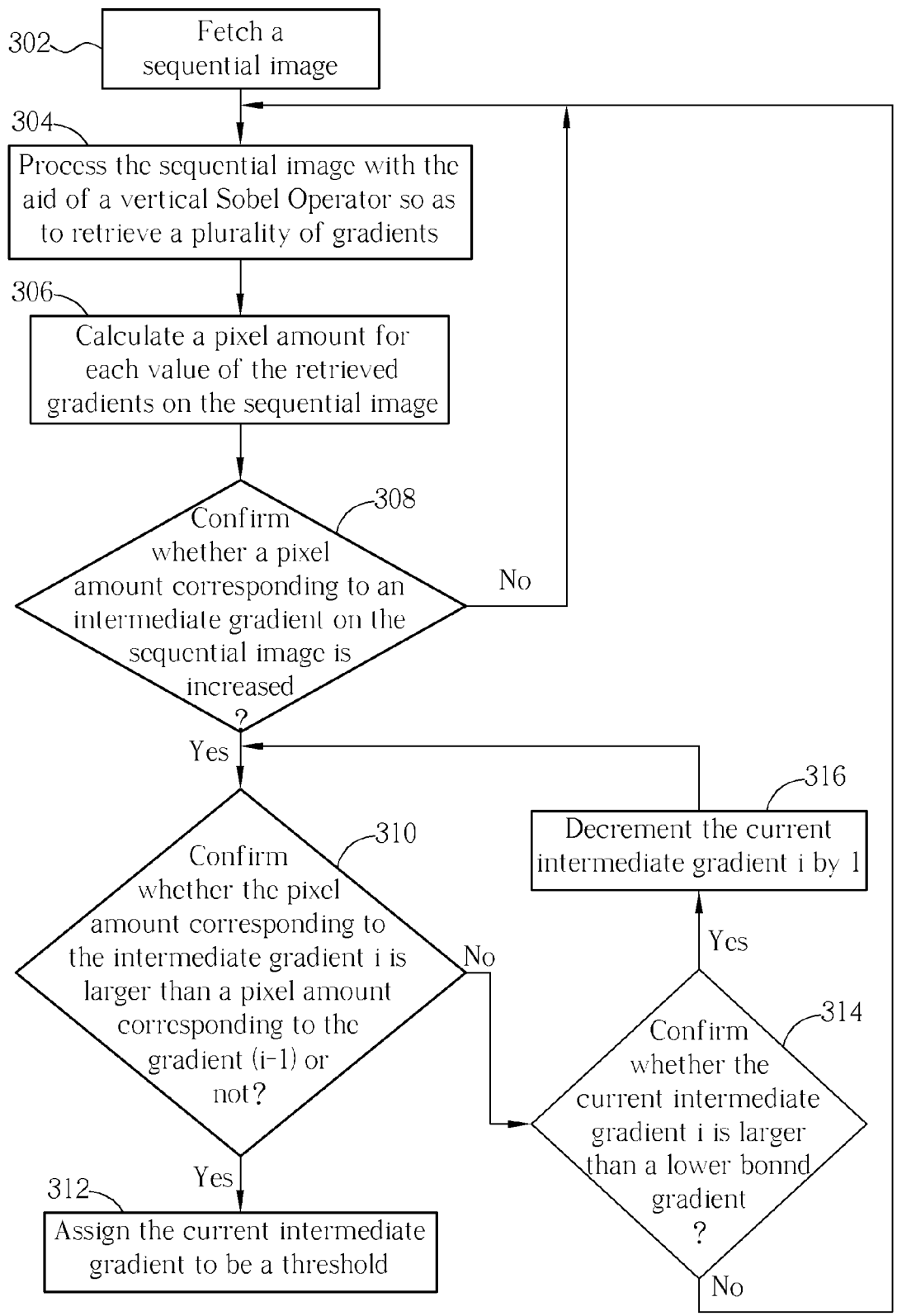
FIG. 3 illustrates a flowchart of edge detection and binarization shown in Step 106 and Step 108 in details.

A preferred embodiment about the edge detection and binarization described above, i.e., Step 106 and Step 108, is summarized as shown in FIG. 3, which illustrates steps as follows:

Step 302: Fetch a sequential image;

Step 304: Process the sequential image with the aid of a vertical Sobel operator, so as to retrieve a plurality of gradients on the sequential image;

Step 306: Calculate a pixel amount for each value of the retrieved gradients on the sequential image;

Step 308: Confirm whether a pixel amount corresponding to an intermediate gradient on the sequential image is increased with respect to a pixel amount of the intermediate gradient on a previously-fetched image or not; when the pixel amount corresponding to the intermediate gradient on the sequential image is increased with respect to the pixel amount of the intermediate gradient on the previously-fetched image is increased, go to Step 310; else, go to Step 304;

Step 310: Confirm whether the pixel amount corresponding to the intermediate gradient i is larger than a pixel amount corresponding to the gradient (i−1) or not, according to the equation as follows:

$$\begin{cases} T = i, & \text{if } N_i > N_{i-1} * X, \\ i = i - 1, & \text{Otherwise,} \end{cases}$$

$$0 < i \leq 255;$$

when the pixel amount corresponding to the intermediate gradient i is larger than the pixel amount corresponding to the gradient (i−1), go to Step 312; else, go to Step 314;

Step 312: Assign the current intermediate gradient to be a threshold;

Step 314: Confirm whether the current intermediate gradient is larger than a lower bound gradient; when the current intermediate gradient i is larger than the lower bound gradient, go to Step 316; else, go to Step 304; and Step 316: Decrement the current intermediate gradient i by 1, and go to Step 310.

[4] Morphological Operations

For clarifying the edges in the fetched image, dilation of morphological operations is performed. Dilation is capable of compensating shattered regions, shapes, interior of objects on a fetched image.

Figure 4:
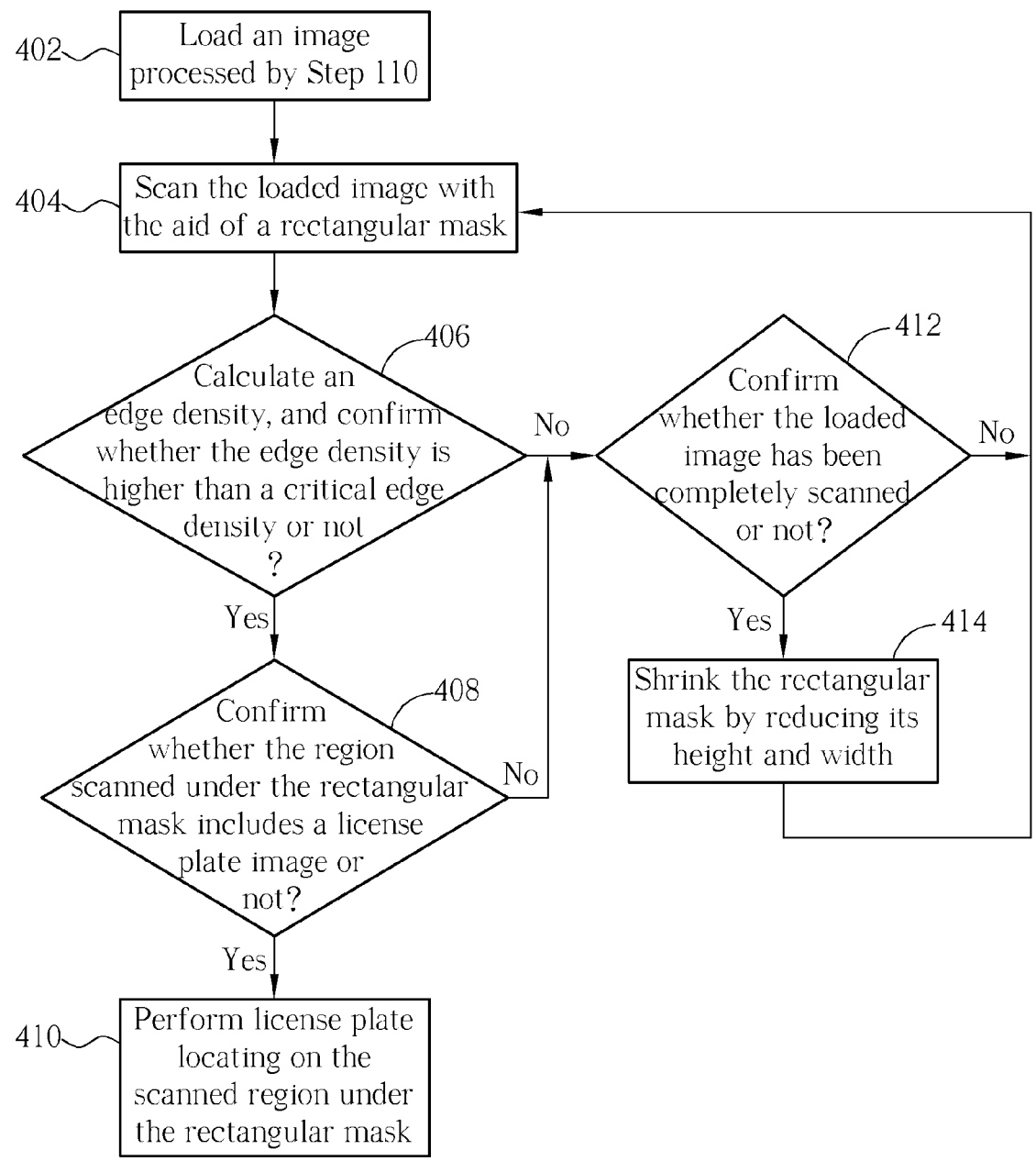
FIG. 4 illustrates a partial-flowchart of the license plate locating method of the present invention, and indicates details of Step 112, Step 114, and Step 116 shown in FIG. 1.

[5] License Plate Locating Algorithm (Step 112, Step 114, Step 116):

The license plate locating method disclosed in the present invention is capable of locating a license plate filmed in a fetched image in an effective manner. Assume a license plate acquires a height-to-width ratio of 1:2, then in the method of the present invention, a rectangular is established according to the assumed height-to-width ratio so as to confirm whether there is a license plate filmed on the fetched image, which has been processed by the Sobel operators, or not. As shown in FIG. 4, which illustrates a partial-flowchart of the license plate locating method of the present invention, and indicates details of Step 112, Step 114, and Step 116 shown in FIG. 1.

First, a rectangular mask M is established with a height H and a width W. The rectangular mask M is then used for scanning the fetched image which has been processed by the Sobel operators, and is thereby used for calculating a pixel amount sum corresponding to the gradient value 255 within a region covered by the rectangular mask M. An edge density D within the covered region of the rectangular mask M is calculated as follows:

$$D = \frac{\text{sum}}{M_{height} * M_{width}}, \quad (4)$$

$$0 \le D \le 1,$$

where $M_{height}$ indicates a current height of the rectangular mask M, and $M_{width}$ indicates a current width of the rectangular mask M. A higher edge density D indicates a strong and concentrated edge variation, and on the contrary, a lower edge density D indicates a weak and sparse edge variation. Then whether the edge density D is higher than a critical edge density, which is set to be 0.6 in one embodiment of the present invention, or not. When the edge density D is lower than the critical edge density, it indicates that there is sparse edge variation within the scanning region of the rectangular mask M, and also indicates that there is no license plate filmed within the scanning region. On the contrary, when the edge density D is higher than the critical edge density, it indicates that there is concentrated edge variation within the scanning region of the rectangular mask M, and also indicates that there is at least one license plate filmed within the scanning region.

The scanning region having a filmed license plate is then further confirmed about whether the filmed license plate physically exits on the scanning region with the aid of a horizontal projection analysis. If the filmed license plate physically exits on the scanning region, horizontal projection of the filmed license plate will be concentrated on middle of the scanning region. Therefore, such a property is used for confirming whether a license plate is filmed on a currently-scanned region or not.

If no license plate is found to be filmed on the fetched image which has been processed by Sobel operators, the rectangular mask M is shrunk with a certain ratio, such as shrunk by k pixels with k being a positive integer, and then the processed image through Step 110 is re-scanned by the shrunk rectangular mask M. The cause of shrinking the rectangular mask M lies in the condition that an image of a filmed license plate may be variable in its size, since a disposing location of the camera is fixed, whereas a moving vehicle may not be fixed in its moving path. Therefore, a larger rectangular M is used for scanning the fetched image in advance. If the license plate is not found under the larger rectangular mask M, it may indicate a situation that the license plate is filmed in a farer location from the camera so that the license late does not occupy a high edge density D under the larger rectangular mask M, and the edge density D could be high enough for finding the license plate after using a shrunk rectangular mask M. However, if no license plate is found after the rectangular mask M has been shrunk to a certain degree, it may indicate a condition that no license plate is fetched or the supposed-to-be-fetched license plate is sheltered by some obstacle on the fetched image so that no license plate region is found on the fetched image which has been processed by the Sobel operators. After applying the abovementioned processes for locating the license plate, the license plate is clearly located and displayed on a screen so that an observer may recognize the license plate in visual or the fetched license plate image could be used for succeeding recognition on the license plate.

According to the above descriptions, FIG. 4 illustrates a license plate locating method which includes steps as follows:

Step 402: Load an image which has been processed by Step 110;

Step 404: Scan the loaded image with the aid of a rectangular mask, so as to retrieve a pixel amount of a plurality of pixels having an upper bound pixel value on the loaded image;

Step 406: Calculate an edge density D according to an equation $$D = \frac{\text{sum}}{M_{height} * M_{width}},$$

$$0 \le D \le 1,$$

where $M_{height}$ indicates a current height of the rectangular mask, and $M_{width}$ indicates a current width of the rectangular mask, and confirm whether the edge density D is higher than a critical edge density or not; when the edge density D is higher than the critical edge density, go to Step 408; else, go to Step 412;

Step 408: Confirm whether the region scanned under the rectangular mask includes a license plate image or not; when the region includes a license plate image, go to Step 410; else, go to Step 412;

Step 410: Perform license plate locating on the scanned region under the rectangular mask;

Step 412: Confirm whether the loaded image has been completely scanned or not; when the loaded image has been completely scanned, go to Step 414; else, go to Step 404; and Step 414: Shrink the rectangular mask by reducing its height and width.

The present invention discloses a license plate locating method applied for a license plate on a moving vehicle and on a digital image recording system. In the disclosed license plate locating method, a camera disposed in a fixed manner is used for continuously filming and detecting a moving vehicle. Images captured by the camera on a gateway monitoring system may be processed according to computer visuals and image processing so as to retrieve a license plate image from a moving vehicle. The filmed image is first detected about whether there is a moving vehicle image or not. If there is a moving vehicle image on the filmed image, edge detection is performed to retrieve the moving vehicle image with boundaries. The retrieved moving vehicle image is then analyzed so as to retrieve characteristics, which are used for locating the precise location of the license plate image, for succeeding recognition of the license plate mage. With the aid of the abovementioned method, besides under a normal weather, the license plate image can also be located under a rainy weather with the aid of binarization, which indicates a moving vehicle segmentation. The disclosed method requires few calculations, cab be easily implemented, and acquires high precision in locating license plate images. Therefore, the disclosed method is appropriate for a digital image recording system, for preceding license plate locating by using ITS so as to enhance succeeding recognition on characters on the license plate image, and capabilities of digital recording products applying the disclosed method can thus be enhanced.

Those skilled in the art will readily observe that numerous modifications and alterations of the device and method may be made while retaining the teachings of the invention.

What is claimed is:

1. A method for locating license plate of a moving vehicle, comprising:
   transforming a color image, which films a moving vehicle, into a first gray level image;
   performing edge detection on the first gray level image by using a Sobel operator, so as to generate a second gray level image, wherein the second gray level image comprises a plurality of gradients of the first gray level image;
   determining a first intermediate gradient, which is from the plurality of gradients of the first gray level image, to be a threshold value, and processing the second gray level image according to the threshold value so as to generate a third gray level image, when a first pixel amount, which is corresponding to the first intermediate gradient and is of the second gray level image, is larger than a second pixel amount, which is corresponding to a second intermediate gradient and is of the second gray level image, by a multiple, wherein the second intermediate gradient is from the plurality of gradients of the first gray level image, and wherein the first intermediate gradient is higher than the second intermediate gradient;
   performing a morphological operation on the third gray level image, so as to generate a fourth gray level image;
   scanning the fourth gray level image by using a rectangular mask, so as to determine an edge density of the fourth gray level image;
   comparing the edge density with a critical edge density, so as to confirm whether there is a license plate image on the fourth gray level image or not; and
   locating the fourth gray level image so as to locate the license plate image and to display the located license plate image on a screen, when the license plate image is determined to be on the fourth gray level image.

2. The method of claim 1,
   wherein transforming the color image into the first gray level image comprises:
   transforming a plurality of red, green, and blue pixel values in the color image into corresponding gray values on the first gray level image, according to an equation:

$$Gray_{i,j} = 0.299 R_{i,j} + 0.587 G_{i,j} + 0.114 B_{i,j};$$

wherein $R_{i,j}$, $G_{i,j}$, and $B_{i,j}$ respectively indicate a red pixel value, a green pixel value, and a blue pixel value at a coordinate (i, j) on the color image, and $Gray_{i,j}$ indicates a gray value at the coordinate (i, j) on the color image.

3. The method of claim 1,
   wherein the performing edge detection on the first gray level image by using the Sobel operator so as to generate the second gray level image comprises:
   performing the edge detection according to a vertical mask of the Sobel operator, so as to generate the second gray level image.

4. The method of claim 1 further comprising:
   adjusting a plurality of gradients of pixels, each of which has a gradient higher than an upper bound gradient and is on the second gray level image, to the upper bound gradient.

5. The method of claim 1, further comprising:
   calculating a plurality of gradients on the second gray level image for different values of gradients, so as to determine an amount of pixels for each value of gradients on the second gray level image.

6. The method of claim 1 further comprising:
   confirming whether the first pixel amount is increased with respect to an amount of pixels corresponding to the first intermediate gradient on a previously-detected color image; and
   confirming whether the first pixel amount is larger than the second pixel amount by the multiple or not, when the first pixel amount is confirmed to be increased with respect to the amount of pixels corresponding to the first intermediate gradient on the previously-detected color image.

7. The method of claim 1,
   wherein determining the first intermediate gradient to be the threshold value comprises:
   confirming whether a pixel amount corresponding to an intermediate gradient i is larger than a pixel amount corresponding to an intermediate gradient (i−1) or not, according to an equation:

$$\begin{cases} T = i, & \text{if } N_i > N_{i-1} * X \\ i = i - 1, & \text{Otherwise,} \end{cases}$$
   $$0 < i \le 255,$$

wherein the intermediate gradient i indicates the first intermediate gradient, and the intermediate gradient (i−1) indicates the second intermediate gradient, T indicates the threshold value, $N_i$ indicate the pixel amounts corresponding to the intermediate gradient i, and $N_{i-1}$ indicate the pixel amounts corresponding to the intermediate gradient (i−1).

8. The method of claim 7, further comprising:
   confirming whether the first intermediate gradient is higher than a lower bound gradient or not, when the first pixel amount is not larger than the second pixel amount by the multiple;
   lowering the value of the first intermediate gradient so as to generate a third intermediate gradient when the first intermediate gradient is higher than the lower bound gradient, and confirming whether a pixel amount corresponding to the third intermediate gradient on the second gray level image is increased or not with respect to an amount of pixels corresponding to the third intermediate gradient on a previously-detected color image;
   confirming whether a third pixel amount, which indicates a pixel amount corresponding to the third intermediate gradient on the second gray level image, is larger than a fourth pixel amount, which indicates a pixel amount corresponding to a fourth intermediate gradient on the second gray level image, by the multiple or not, wherein the third intermediate gradient is higher than the fourth intermediate gradient; and confirming whether the third intermediate gradient is higher than the lower bound gradient, when the third pixel amount is confirmed to be not larger than the fourth pixel amount by the multiple.

9. The method of claim 1, wherein performing the morphological operation on the third gray level image so as to generate the fourth gray level image comprises:
performing a dilation operation of the morphological operation on the third gray level image, so as to generate the fourth gray level image.

10. The method of claim 1,
wherein scanning the fourth gray level image by using the rectangular mask, so as to determine the edge density of the fourth gray level image comprises:
calculating an edge density D, according to an equation $$D = \frac{sum}{M_{height} * M_{width}},$$
$$0 \le D \le 1,$$

wherein sum indicates a pixel amount corresponding to a specific gradient on the fourth gray level image, $M_{height}$ indicates a current height of the rectangular mask, and $M_{width}$ indicates a current width of the rectangular mask.

11. The method of claim 1,
wherein comparing the edge density with the critical edge density so as to confirm whether there is a license plate image on the fourth gray level image or not comprises:
confirming whether there is a license plate image on the fourth gray level image or not by using horizontal projection, when the edge density is higher than the critical edge density.

12. The method of claim 11,
wherein confirming whether there is a license plate image on the fourth gray level image or not by using the horizontal projection comprises:
confirming whether the fourth gray level image has been completely scanned or not, when there is no license plate image on the fourth gray level by using the horizontal projection.

13. The method of claim 12, further comprising:
reducing a size of the rectangular mask, and scanning the fourth gray level image by using the reduced rectangular mask, when the fourth gray level image has been confirmed to be completely scanned.

14. The method of claim 1,
wherein comparing the edge density with the critical edge density so as to confirm whether there is a license plate image on the fourth gray level image or not comprises:
confirming whether the fourth gray level image has been completely scanned or not, when the edge density is lower than the critical edge density.

15. The method of claim 14, further comprising:
reducing a size of the rectangular mask, and scanning the fourth gray level image by using the reduced rectangular mask, when the fourth gray level image has been confirmed to be completely scanned.

* * * * *